F. SAMUELSON.
POWER GENERATING PLANT.
APPLICATION FILED SEPT. 8, 1915.
1,215,200.
Patented Feb. 6, 1917.
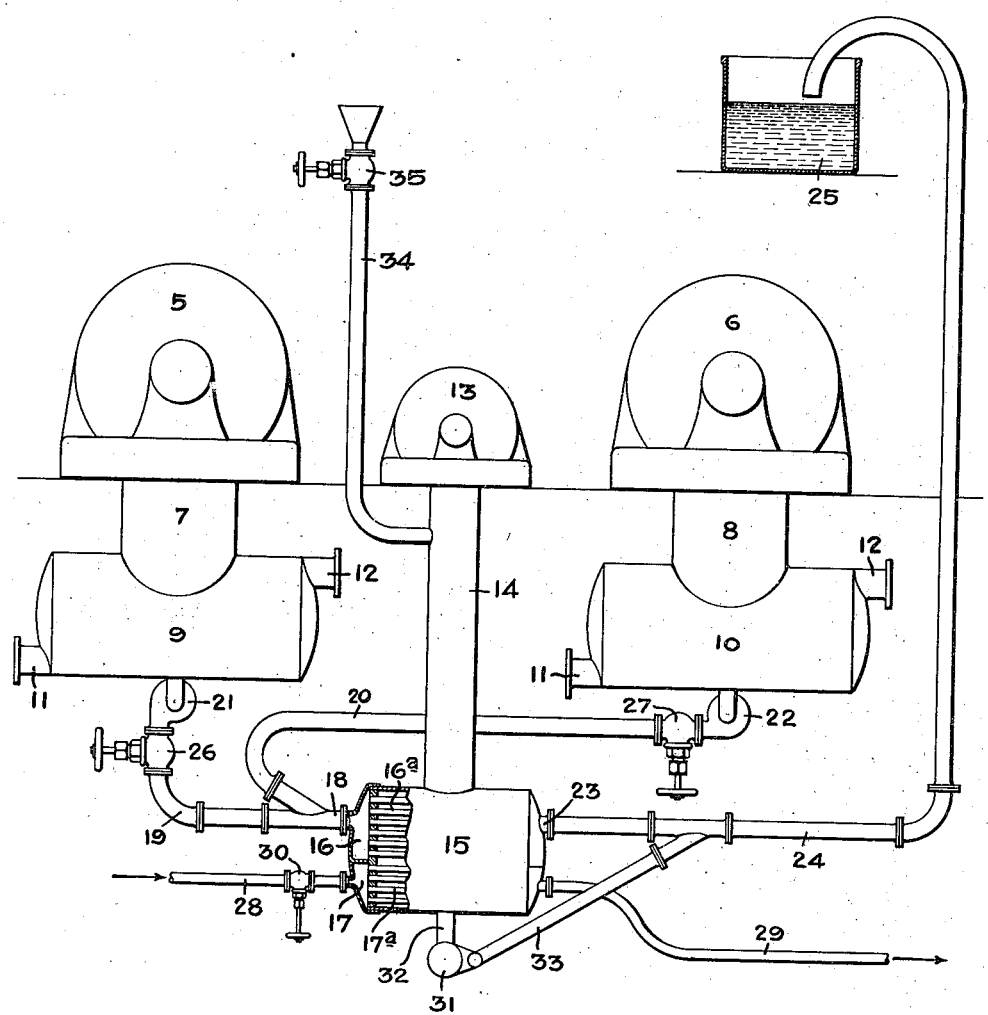
Inventor:
Frederick Samuelson,
by: Albert G. Davis
His Attorney.

UNITED STATES PATENT OFFICE.

FREDERICK SAMUELSON, OF RUGBY, ENGLAND, ASSIGNOR TO GENERAL ELECTRIC COMPANY, A CORPORATION OF NEW YORK.

POWER-GENERATING PLANT.

1,215,200.

Specification of Letters Patent.

Patented Feb. 6, 1917.

Application filed September 8, 1915. Serial No. 49,533.

*To all whom it may concern:*

Be it known that I, FREDERICK SAMUELSON, a subject of the King of Sweden, residing at Rugby, county of Warwickshire, England, have invented certain new and useful Improvements in Power-Generating Plants, of which the following is a specification.

The present invention relates to power generating plants in which a small non-condensing engine or turbine is used to drive the auxiliaries, such as the circulating pumps, air pumps, mechanical stokers, etc., and has for its object to provide an improved arrangement wherein the exhaust from the non-condensing turbine is utilized to the greatest advantage.

For a consideration of what I believe to be novel and my invention, attention is directed to the accompanying specification and the claims appended thereto.

The accompanying drawing illustrates diagrammatically a plant embodying my invention.

Referring to the drawing, 5 and 6 indicate two condensing prime movers, as steam turbines having their exhaust conduits 7 and 8 connected to condensers 9 and 10. 11 and 12 indicate the conduits for conveying the cooling water to and from these condensers. The prime movers represent the main units of a plant and may, for example, drive main electric generators.

13 indicates a small non-condensing prime mover as a turbine or engine which furnishes power to drive the auxiliaries. It may drive them direct or it may drive a small electric generator, for example, which furnishes power to drive the auxiliaries by means of suitable electric motors. The exhaust from the prime mover 13 is conveyed by conduit 14 to a condenser 15. This condenser comprises two independent sections 16 and 17 so far as cooling water therefor is concerned that is the circulation through the cooling tubes 16ª and 17ª of the two sections is absolutely distinct and separate. The section 16 which may be regarded as the main section, has its inlet 18 connected to the main condensers 9 and 10 by way of conduits 19 and 20, and 21 and 22 indicate circulating pumps arranged in these conduits for pumping the condensate from the main condensers through the cooling tubes 16ª of this section where it serves as cooling water for it. The outlet 23 of this section of condenser 15 is connected by suitable piping 24 to the hot well 25 from which feed water is supplied to the boilers of the plant. 26 and 27 indicate suitable valves in conduits 19 and 20 so that either of the main condensers may be shut off from the condenser 15. The section 17 of condenser 15 is a supplemental or secondary condenser section and receives cooling water by way of pipe 28, which water may be obtained from any suitable source of supply, and which is led off by pipe 29. 30 is a regulating valve in pipe 28. 31 indicates a condensate pump for condenser 15, its suction side being connected by pipe 32 to the casing of such condenser and its discharge side being connected by pipe 33 to conduit 24 through which the condensate is delivered to the hot well 25. 34 indicates a pipe leading from pipe 14 to atmosphere and having a valve 35 therein. By opening this valve the pipe 14 may be connected directly to atmosphere to provide an atmospheric exhaust for the non-condensing turbine.

By the above described arrangement it will be seen that when the plant is operating the exhaust from the non-condensing prime mover 13 is used to heat the condensate from condensers 9 and 10, which condensate is utilized for feed water, or, looking at it in the opposite sense, the condensate from the condensers 9 and 10 is utilized to condense the exhaust from the prime mover 13, which condensate is also pumped to the hot-well for feed water. With this arrangement, therefore, so long as the condensate from condensers 9 and 10 is sufficient to condense all the exhaust from the prime mover 13, substantially all the heat of such exhaust steam is put into the feed water and thus saved. It is customary in a plant of this character however to run all the auxiliaries at constant speed and power irrespective of the load on the main unit, or units, in connection with which they are used, and the quantity of exhaust steam from the small non-condensing unit is, accordingly, substantially constant irrespective of the load on the main unit or units. At lighter loads, therefore, the exhaust steam available from the non-condensing unit will be in excess of that required to heat the feed water, or to put it the other way, the quantity of condensate from the main condensers is insufficient to condense all the exhaust from the non-condensing unit. In operation, therefore, when the main unit or units are operating at full load, the valve 30 is closed cutting out the lower portion 17 of the condenser 15 and all the exhaust from prime mover 13 is condensed by the condensate from the main condensers 9 and 10. At such times substantially all the heat from this exhaust is saved and put into the hot well. At light load on the main unit or units at which time, as already explained, the condensate from the main condenser or condensers will be insufficient to condense all the exhaust from the prime mover 13, the valve 30 is opened more or less to admit an amount of cooling water in addition to the condensate from the main condenser sufficient to cause the condensation of all the exhaust. By this arrangement it will be seen that at light load the heat of the excess of exhaust steam over that required to heat the condensate from the main condensers, or the excess of exhaust steam over that which the condensate from the main condensers can condense is not all lost, as would ordinarily be the case, but only so much of it as is carried away by the cooling water used in the lower section 17 of condenser 15, since, as will be remembered, the condensate of condenser 15 is pumped to the hot well 25. It will be understood that the cooling water used in the portion 17 of condenser 15 may be an impure supply not suitable for use in the boilers and by the arrangement as described wherein the condenser 15 comprises two absolutely independent portions for the circulation of cooling water, I avoid any possible commingling of the two supplies of cooling water and the consequent contamination of the feed water.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means within the scope of the appended claims.

What I claim as new and desire to secure by Letters Patent of the United States, is:—

1. The combination of a prime mover, a condenser therefor, a second prime mover, a condenser for it, and means for conveying the condensate from the first named condenser to the second condenser to be used as the cooling medium therein.

2. The combination of a prime mover, a condenser therefor, a second prime mover, a condenser for it having two separate compartments for cooling medium, means for conveying the condensate from the first named condenser to one of said compartments to be used as the cooling medium therein, and means for supplying cooling medium from another source to the other of said compartments.

3. The combination of a main condensing prime mover, a condenser therefor, a non-condensing prime mover which drives the auxiliaries for the first, a condenser for the non-condensing prime mover which utilizes the condensate from the first named condenser as cooling fluid whereby it serves to heat the same for feed water, and means for supplying a separate auxiliary supply of cooling fluid to the second named condenser when the supply of condensate from the first named condenser is insufficient to condense all the exhaust from the non-condensing prime mover.

4. The combination of a main condensing prime mover, a condenser therefor, a non-condensing prime mover which drives the auxiliaries for the first, a condenser for the non-condensing prime mover having a single condensing chamber and two distinct sets of tubes for cooling fluid, a hot well, means connecting one of said sets of cooling tubes to receive the condensate from the first named condenser, and discharge it to the hot well, means connecting the other set of cooling tubes to a separate supply of cooling fluid, and a conduit for conveying the condensate from the second named condenser to the hot well.

In witness whereof, I have hereunto set my hand this twenty-fourth day of August, 1915.

FREDERICK SAMUELSON.

Witnesses:
J. A. Foster,
Charles H. Fuller.